C. W. NARAMOR.
BEAN POLISHER.
APPLICATION FILED DEC. 4, 1915.
1,285,322.
Patented Nov. 19, 1918.
6 SHEETS—SHEET 5.
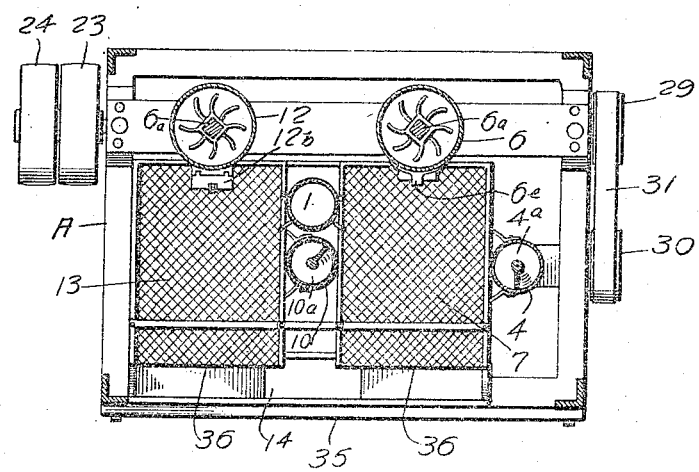
Fig. 5.
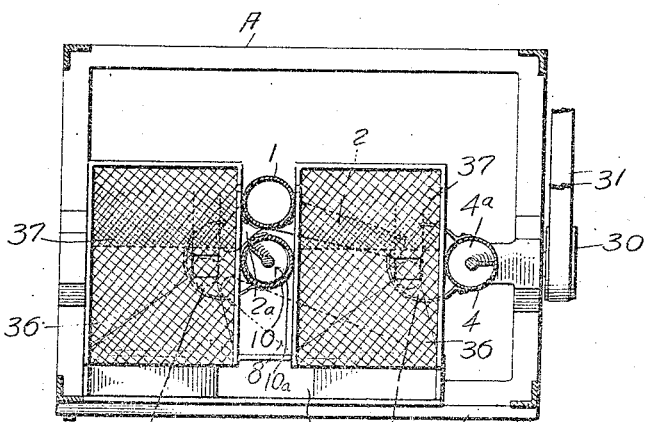
Fig. 9.
Fig. 15.
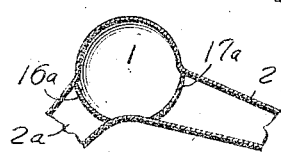
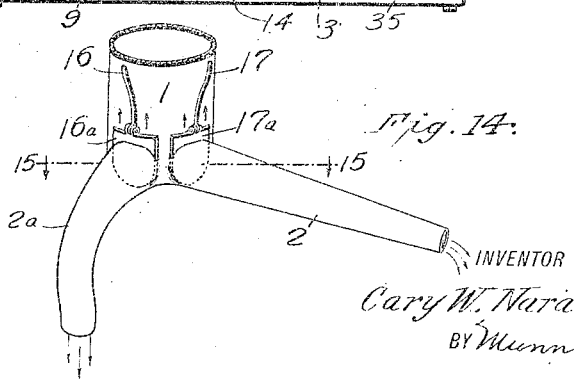
Fig. 14.
WITNESSES:
INVENTOR
Cary W. Naramor
BY Munn & Co.
ATTORNEYS

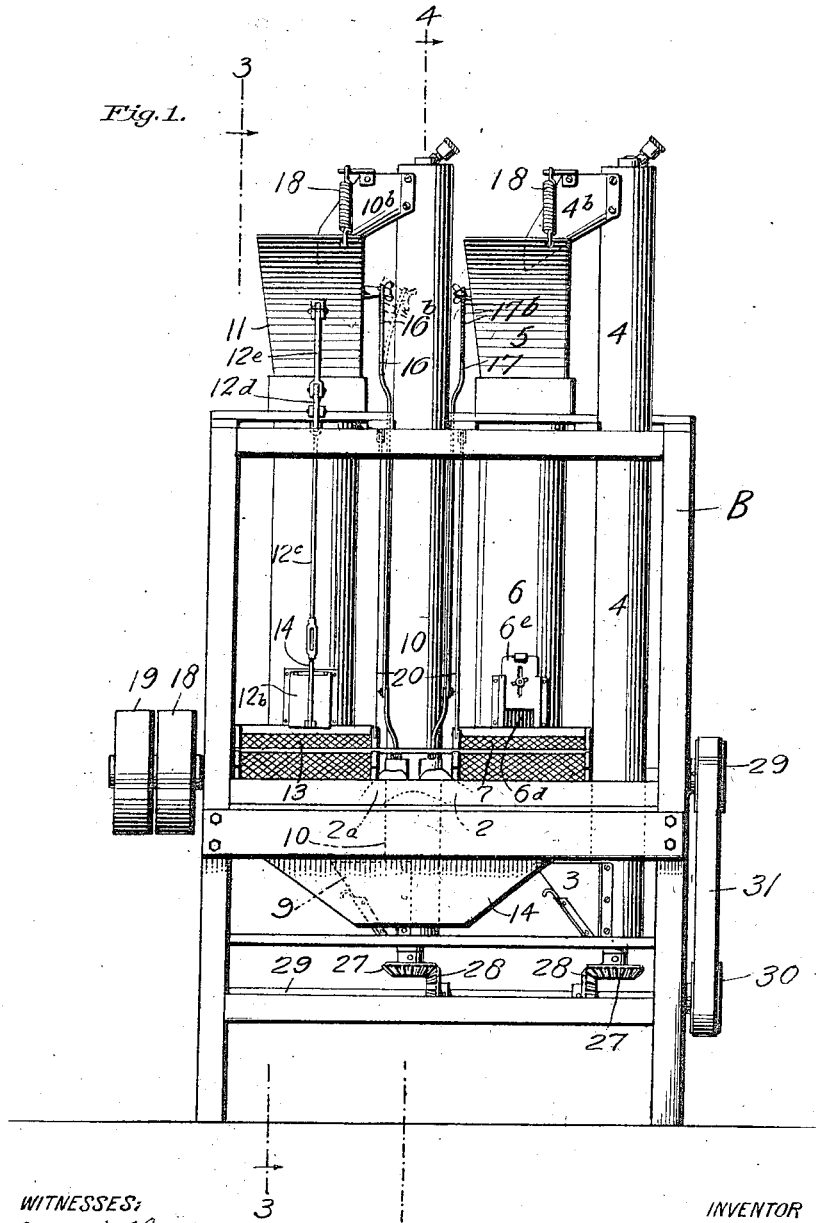

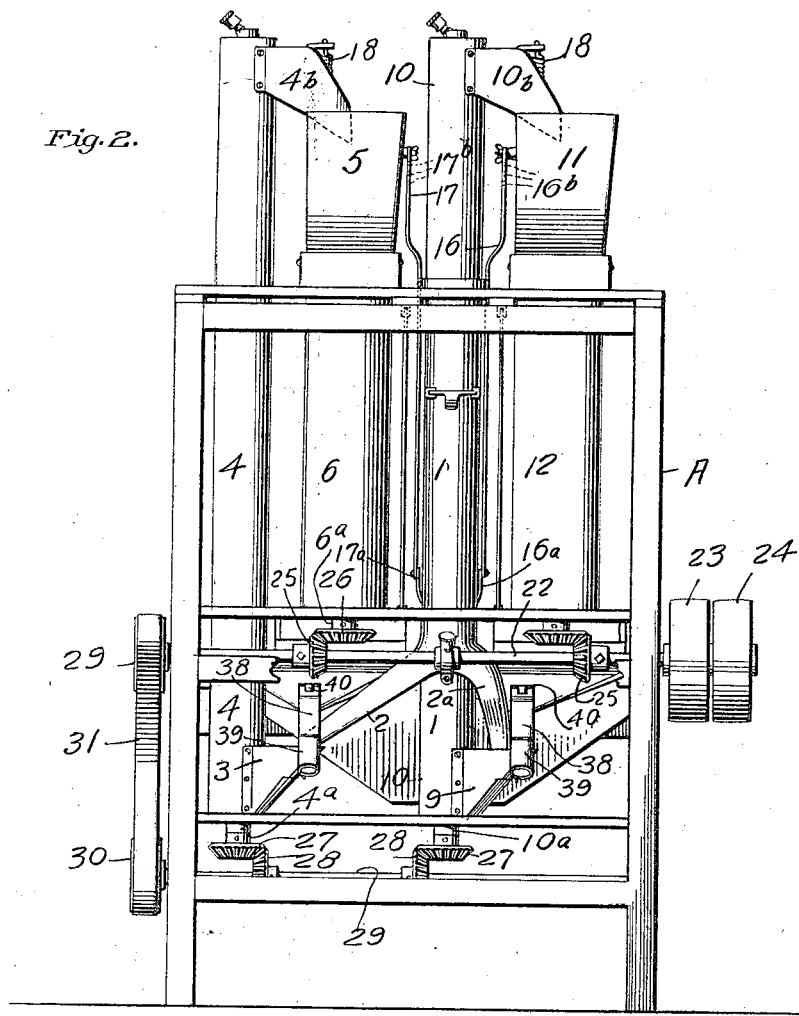

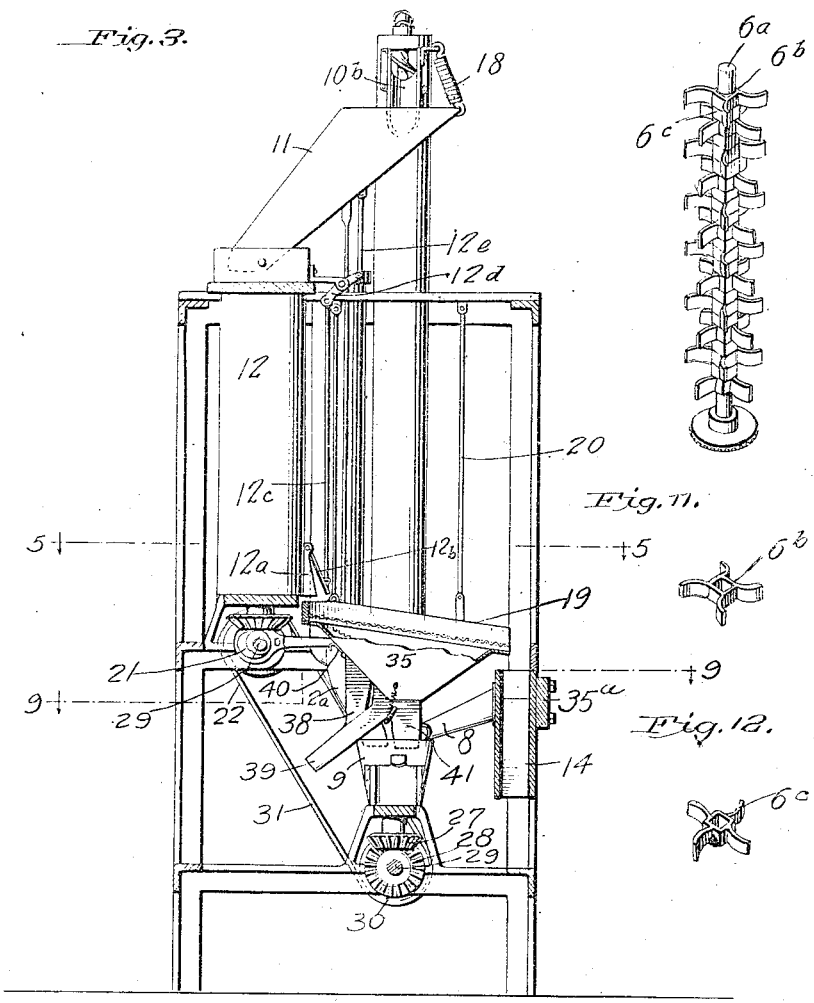

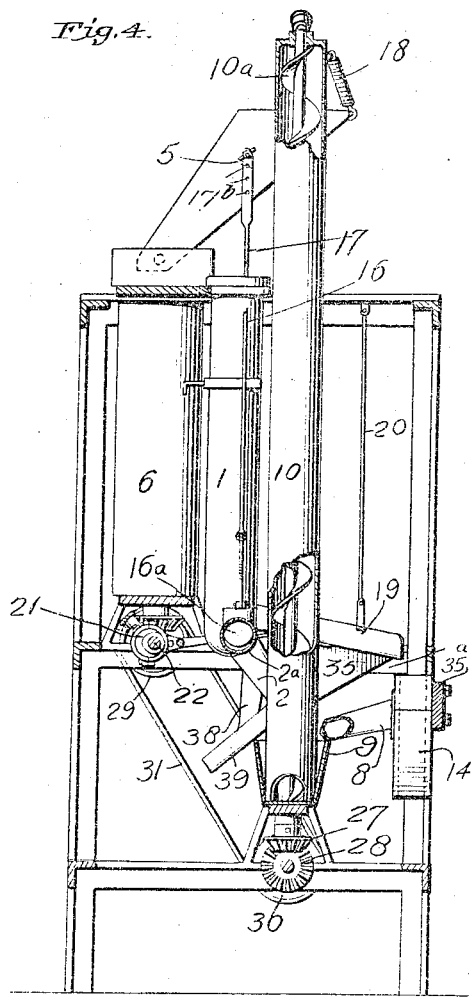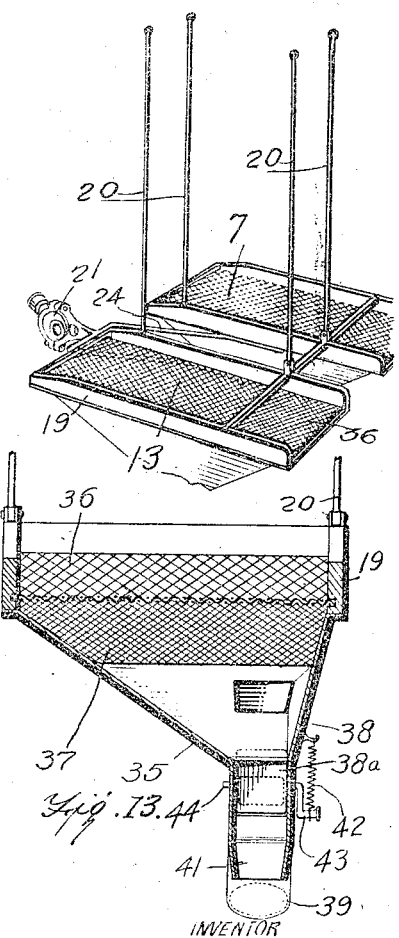

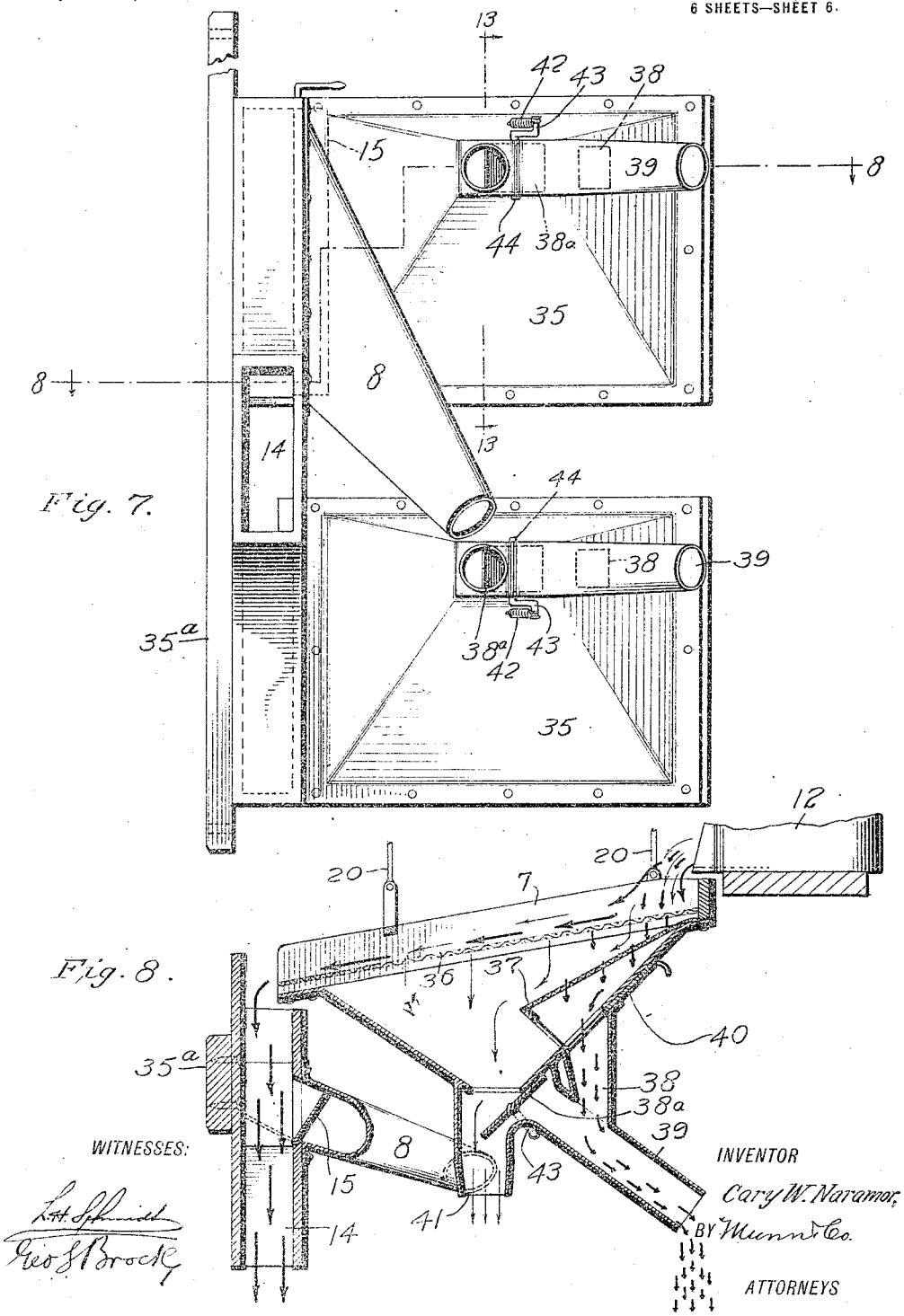

UNITED STATES PATENT OFFICE.

CARY W. NARAMOR, OF MECOSTA, MICHIGAN.

BEAN-POLISHER.

1,285,322.

Specification of Letters Patent.  Patented Nov. 19, 1918.

Application filed December 4, 1915. Serial No. 65,027.

*To all whom it may concern:*

Be it known that I, CARY W. NARAMOR, a citizen of the United States, and a resident of Mecosta, in the county of Mecosta and State of Michigan, have made certain new and useful Improvements in Bean-Polishers, of which the following is a specification.

My invention relates to improvements in machines for polishing beans and more particularly to that type of polisher in which dry saw dust, cracked corn or bran is used mixed with the beans and the mixture agitated while passing through certain cycles of movement.

My invention consists in means for polishing beans running single or double: it consists further in certain novel features of construction, arrangement, and combination of parts as will be hereinafter described and pointed out in the claims reference being had to the accompanying drawings in which—

Figure 1 is a front elevation of my improved machine.

Fig. 2 is a rear elevation.

Fig. 3 is a vertical section elevation on line 3—3 of Fig. 1.

Fig. 4 is a similar view taken on line 4—4 of Fig. 1.

Fig. 5 is a horizontal sectional view on line 5—5 of Fig. 3.

Fig. 6 is a perspective view of the separator screens detached from the frame of the machine.

Fig. 7 is a bottom view of the carrier located below the vibrating screens.

Fig. 8 is a section on the line 8—8 of Fig. 7.

Fig. 9 is a horizontal section showing a plan of the device shown in Fig. 7 and taken on line 9—9 of Fig. 3.

Figs. 10, 11 and 12 are perspective views of the agitators.

Fig. 13 is a section on line 13—13 of Fig. 7.

Fig. 14 is a perspective view of lower end of feed spout.

Fig. 15 is a section of the same on line 15—15 of Fig. 14.

In carrying out my invention I support the polishing mechanism in a suitable structure composed of end frames A of cast iron, the corner posts B made of angle iron and cross beams of metal.

In the frame work is supported a bean receptacle 1 in which the beans to be polished are first placed; from the bottom of said receptacle 1 are the discharge spouts 2 and $2^a$ (see Fig. 2), running to the boots 3 and 9 at the lower ends of the vertical and parallel conveyer tubes 4 and 10 respectively containing spiral elevators $4^a$ and $10^a$; at the rear of the frame are located the two vertical and parallel polishing cylinders 6 and 12 which are fed from the hoppers 5 and 11; the hoppers being located adjacent and to the side of the upper ends of the elevator tubes 4 and 10 said hoppers receiving the beans and polishing agents by means of the downwardly inclined transverse spouts $4^b$ and $10^b$. In each of the polishing cylinders of tubes 6 and 12 is mounted a vertical shaft $6^a$ which is square in cross-section and on these shafts are placed the agitators which are made as shown in Figs. 10, 11, and 12 and they are placed upon the shaft beginning from the lower end in definite relations or in regular alternation; that is, the agitator member $6^b$ having the curved fingers extending from the corners is placed on the shaft first, then a washer then the agitator $6^c$ having fingers extending from the sides next, another washer then the first form $6^b$ and so on to the upper end of the tubes; the polishing cylinders 6 and 12 are substantially similar in construction except that cylinder 6 has at its lower end an opening $6^d$ to discharge the beans, which is controlled by a slide $6^e$ adjusted by a slot and wing nut, by which the size of said opening $6^d$ can be varied, and the flow of the beans regulated to a shaking screen 7 in front of it; the other cylinder 12 has at its lower end an opening, on each side of which are the beveled or wedge shaped hinge plates $12^a$ between which is hinged the flat door $12^b$ controlling said opening; said door has secured to it a rod $12^c$ which extends upwardly and is attached to a lever $12^d$ mounted in the frame work of the device adjacent the upper end of cylinder 12, to the other end of the lever $12^d$ is pivoted a connecting rod $12^e$ having a pivotal connection with the hopper 11 which is pivotally mounted within the upper end of cylinder 12 and said hopper controls the flow of beans into said cylinder keeping the cylinders full but never allowing them to run over or become empty: this is done by the means of automatic nature of the device as the hopper has a flexible connection 18 with the spouts $4^b$ and $10^b$. The weight of the beans in the hopper 11 will cause the door 12$^b$ to open more or less and thus through the rods 12$^c$ and 12$^e$ and lever 12$^d$ control the position and feed of hopper 11.

At the front of the cylinders 6 and 12 are located the vibrating screens 7 and 13 which are mounted in a frame 19 and suspended by rods 20 from the frame work of the device: the screen device is shown removed from the frame work of the machine, in Fig. 6; said frame is given a vibrating back and forth motion by pitmen 24$^a$ and the strap and eccentric 21, mounted on the shaft 22 which derives its motion from the drive pulley 23 mounted on said shaft 22 outside the frame of machine. This shaft 22 carries bevel gears 25 which drive the shafts 6$^a$ in the polishing cylinders 6 and 12 while the shafts 4$^a$ and 10$^a$ within the conveyer tubes 4 and 10 are driven by bevel gears 27 fitted on the lower ends of the shafts said bevel gears meshing with bevel gears 28 mounted on shaft 29 on which is mounted a drive pulley 30 driven by belt 31 from shaft 22.

In Fig. 2 are shown the rods 16 and 17 which are shut off rods connected respectively to the cut off slides 16$^a$ and 17$^a$ respectively. When running beans double the rod 16 is left detached from hopper 11 and secured to tube 10 as indicated in dotted lines in Fig. 1 but is coupled up to said hopper 11 when running beans single.

It will be noticed that the elevator tube 10 is between the screens 7 and 13 while the tube 4 is at one side of screen. Below the vibrating screens 7 and 13 and secured to a frame thereof is the delivery device 35 which is located below the bottom of the screen frame and carries the polishing agent into the boots 3 and 9 at the bottom of conveyers 4 and 10: in this device the beans fall upon the screen 36 and the polishing material and dirt pass through said screen to finer screen 37 the polishing agent running over said fine screen, the dirt going through the screen and through the openings 38 and out of the machine at 39: a shut off 38$^a$ is used where it is desired to let polishing agent out of the machine at 39. 40 is a slide to close the openings at 38 if it is not desired to screen dirt out of the polishing agent: in this position of the slide that is closed it goes out at 41, the cut off 38$^a$ being turned for that purpose and held by spring 42 attached at one end to crank 43, attached to shaft 44, which carries cut off 38$^a$. At 14 is shown a discharge spout for beans to run from screen 7 to boot 9 whence they are delivered to elevator tube 10.

For running beans double shut off rod 16 is left detached from hopper 11 and the cut off slide 16$^a$ closes spout 2$^a$; lid 15 is thrown forward as indicated in dotted lines in Fig. 8; the slide in spout 1 is then pulled out, allowing beans to go through spout 2 into boot 3 from which they are carried upwardly in conveyer 4 into hopper 5, the slide 6$^e$ being set for the desired amount of beans to be run; then apply dry granular polishing agent in hopper 5 as cylinder 6 is filling and a certain weight in hopper 5 which will cause it to pull down at top and shove rod 17 down shoving slide 17$^a$ into spout 2 thus retarding the beans: now as the beans come out at 6$^d$ onto screen 7 being forced downwardly by the agitators and weight and pressure of the mixture above, and discharge at its lower end into spout 8 that goes to boot 9 they are carried up by conveyer 10 into hopper 11, dry granular polishing agent being applied to hopper 11 while cylinder 12 is filling and a certain amount in hopper 11 which will cause it to pull down and by means of rods 12$^c$ and 12$^e$ and lever 12$^d$ cause door 12$^b$ to open and let beans out onto screen 13. The hoppers should contain about the same amount by weight of beans. Spout 2 will furnish more beans than the machine can take care of and is controlled by hopper 5 after it gets a certain weight of beans in it caused by opening or closing of the slide 17$^a$. It will be noticed that hopper 11 works in harmony with hopper 5 as it takes a certain weight of beans in 11 before the beans will discharge from door 12$^b$.

For running beans single, the rod 16 is attached to hopper 11 and this opens spout 2$^a$; now throw lid 15 back as shown in full lines in Fig. 8; this closes spout 8 and opens discharge spout 14; the beans at the right side of the machine run from 1 to spout 2 to boot 3 to conveyer 4 to hopper 5 to tube 6 to screen 7 and out of discharge spout 14; at the left side of the machine the run is from No. 1 to spout 2$^a$ to boot 9 to conveyer 10 to hopper 11 to cylinder 12 to screen 13 and out of discharge 14, secured to beam 35$^a$.

To increase the capacity on the right side of the machine raise slide 6$^e$ which draws the beans faster from hopper 5, allowing it to rise slightly which raises slide 17$^a$ allowing conveyer 4 to get more beans for hopper 5. To increase capacity of the left side of the machine fasten shut off rod 16 one or more of holes higher up on hopper 11 thus raising the cut off slide 16$^a$ and increasing the flow of beans through spout 2$^a$ and allowing conveyer 10 to carry more beans to hopper 11 and causing said hopper 11 to pull down a little more which action opens door 12$^b$.

The polishing agent which is always dry and granular always stays on the same side of machine it is put in and is put in machine at the hoppers, and is taken out of machine by turning the shut off 38$^a$.

The slide 6$^e$ being set in polishing cylinder 6 for the amount of beans it is desired to run the machine will then take care of itself.

Both hoppers 5 and 11 work automatically and cannot overflow; neither can they get empty as beans will not come out of cylinder 12 until some weight is in the hopper 11.

A vertical series of holes 16^b and 17^b is arranged at the upper ends of shut off rods 16 and 17 respectively for regulating their throw.

I claim:

1. A bean polishing device comprising a storage tube adapted to hold a supply of beans to be polished, automatically controlled discharging means at the lower end of said tube, means for elevating the beans from said discharge means, mixture feeding means for receiving the elevated beans and a dry granular polishing agent, a polishing cylinder adapted to receive the mixture of beans and polishing agent from the last mentioned means, agitators within said polishing cylinder to aid in forcing the mixture downwardly, outlet means at the lower end of the polishing cylinder automatically controlled from the mixture feeding means, means adjacent said outlet means receiving the discharged mixture and separating the same, and means coöperating with the separating means for discharging the separated beans and polishing agent.

2. A bean polishing device comprising a tube to hold and feed a supply of beans, discharge spouts at the lower end thereof, receiving boots adjacent the lower ends of said spouts, vertical elevator tubes communicating at their lower ends with the boots, movable hoppers adjacent the upper ends of said elevator tubes to receive the elevated beans and a dry granular polishing agent, polishing cylinders having their upper ends adjacent to said hoppers, rotary agitators in said polishing cylinders to aid in forcing downwardly the mixture of beans and polishing agent within said cylinders, screening mechanism adjacent the lower end of each of the polishing cylinders, and means automatically actuated by the movable hoppers for causing the mixture to first pass downwardly through one polishing cylinder, then discharge to its screen member, elevating this discharge from the first screen to the second polishing cylinder, thence to its screen member, and finally to discharge from the machine.

3. A bean polishing device comprising in combination a storage tube adapted to contain and feed a supply of beans, means for conveying the beans from the storage tube to a plurality of elevating mechanisms, weight actuated feed hoppers to receive the beans from the elevating mechanism and a supply of dry granular polishing agent, a plurality of vertical polishing cylinders to receive the mixture from the hoppers, screening means adjacent the lower ends of the polishing cylinders, and means actuated by the feed hoppers for causing the entire mixture to successively pass through each polishing cylinder.

4. A bean polishing device consisting of a storage and supply tube adapted to contain a supply of beans, branch spouts at the lower end thereof, valves controlling each branch, vertical elevator tubes, boots at the lower ends of said tubes and communicating with the branch spouts, spouts adjacent the upper and discharge ends of the elevator tubes, weight actuated movable hoppers below said last-mentioned spouts, means connecting the movable hoppers and the valves in the branch spouts, polishing cylinders below said hoppers, screen mechanism adjacent the lower ends of the polishing cylinders, a discharge trough beneath the screen mechanism, and valve mechanism in said trough to permit the beans to run successively from one polishing cylinder through one of the vertical elevator tubes to the other polishing cylinder, or to pass through each cylinder only.

5. A bean polishing device consisting of a bean storage and supply tube, branch spouts diverging therefrom, cut offs controlling said spouts, a pair of vertical elevator tubes, receiving boots at the lower ends thereof and communicating with the branch spouts, discharge spouts at the upper ends of the elevator tubes, movable weight controlled hoppers adjacent said discharge spouts, means connecting the cut offs of the branch spouts with said hoppers, vertical polishing tubes having rotary agitators therein and located beneath the hoppers and having discharge openings at their lower ends, vibratory screens adjacent said openings to receive the mixture of bean and polishing agents, a receiving trough beneath said screens and valve mechanism in said trough to control the discharge therefrom.

6. A bean polishing device consisting of a storage and supply tube adapted to hold a supply of beans, branch spouts diverging therefrom, valves controlling said spouts, receiving boots adjacent ends of said spouts, elevator tubes communicating with said boots, discharge spouts at the upper ends of the elevator tubes, weight actuated hoppers adjacent said discharge spouts, connections between the hoppers and the valve mechanism of the branch spouts, vertical polishing cylinders secured to the lower ends of the hoppers and having discharge means at their lower ends, means connecting one of said hoppers with one of said discharge means, and screening mechanism adjacent said discharge means to receive and distribute the bean mixture and separate the polishing agents therefrom.

7. In a bean polishing device the combination of a feed tube adapted to hold a supply of beans, a pair of spouts diverging from the lower end of said tube, a pair of elevator tubes having boots at their lower ends communicating with the aforesaid diverging spouts, weight controlled and actuated hoppers adjacent the upper ends of said elevator tubes to receive dry granular polishing agents and the beans, a pair of polishing chambers at the lower ends of the hoppers, rotary agitators within said polishing cylinders, discharge means at the lower ends of the polishing chambers automatically controlled by the said hoppers, vibratory screens adjacent said discharge means, for separating the beans from the polishing agents, a distributing trough beneath said screens, and valve mechanism in said trough for causing the polishing agents to be either discharged from the polishing cylinders or to be carried through the machine successively and continuously through the machine.

8. A bean polishing device consisting of a feed tube adapted to contain a supply of beans and provided with a pair of openings at its lower end, slide gates controlling said openings, a pair of spouts diverging from said openings, a pair of elevator tubes having receiving boots at their lower ends adjacent the ends of said spouts and communicating therewith, a pair of vertical polishing chambers and rotary agitators therein, hoppers movably connected to the upper ends of said polishing chambers, said hoppers adapted to receive dry granular polishing agents and the beans from the elevator tubes, rods connecting the hoppers with the slide gates of the diverging lower discharge spouts, discharge openings at the lower end of each of the polishing chambers, a swinging gate controlling the opening of one of said polishing chambers, lever connections between said gate and the hopper of such polishing chamber whereby said gate is controlled by movement of the hopper, a vibratory screen frame adjacent the discharge openings at the lower ends of the polishing chamber, a distributing trough carried by said screen frame, screens carried by said trough for separating beans from the polishing agents and dirt from the polishing agents, and valve mechanism in said trough for causing the polishing agents to be discharged from the machine or to be carried through the machine successively or continuously.

9. A bean polishing device consisting of a supply tube to hold and feed a supply of beans, diverging discharge spouts at the lower end thereof, receiving boots adjacent the lower ends of said spouts, elevator tubes communicating with said boots, vertical polishing cylinders adjacent said elevator tubes, movable hoppers mounted on said polishing chambers and adapted to receive a mixture of beans and dry granular agents from the elevator tubes, discharge means at the lower ends of the polishing cylinders, means connecting the hoppers with the discharge spouts of the supply tube and with the discharge means of one polishing chamber whereby the hoppers coöperate through weight of the mixture therein to control feed to the polishing chambers and discharge therefrom.

CARY W. NARAMOR.

Witnesses:
 RAY GRAHAM,
 E. BROMLEY.

Copies of this patent may be obtained for five cents each, by addressing the "Commissioner of Patents, Washington, D. C."